Sept. 12, 1944. L. M. CHRISTENSEN 2,358,212
METHOD OF PRODUCING BUTYLENE GLYCOL
Filed March 12, 1941
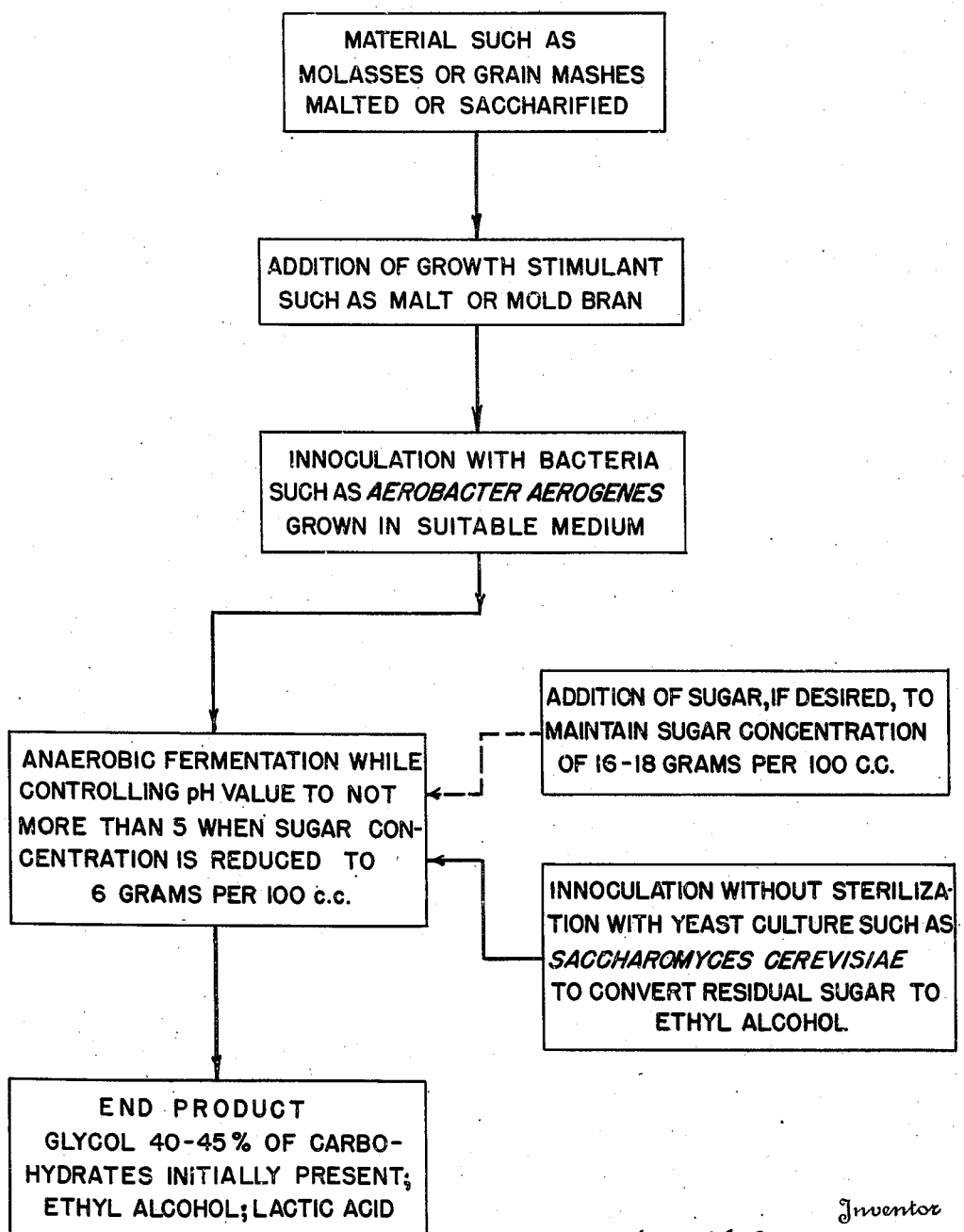

Patented Sept. 12, 1944

2,358,212

UNITED STATES PATENT OFFICE 2,358,212

METHOD OF PRODUCING BUTYLENE GLYCOL

Leo M. Christensen, Moscow, Idaho, assignor to National Agrol Company, Inc., New York, N. Y., a corporation of Delaware Application March 12, 1941, Serial No. 383,052

6 Claims. (Cl. 195—13)

This invention relates to methods of producing 2,3-butylene glycol by the fermentation of carbohydrates, and more especially to processes in which both a high concentration of carbohydrates is used in the starting material and the hydrogen ion concentration is/controlled during the fermentation and in which there is a reduction in the quantity of residual carbohydrates.

My co-pending application, Serial No. 383,051, filed March 12, 1941, disclosed a method of producing butylene glycol by the fermentation of carbohydrates in which is present in the starting material a high concentration of carbohydrates in proportion to the bacterial culture and in which this concentration is maintained and the hydrogen ion concentration is controlled within a specified range by the neutralization of acid formed during the fermentation step.

The object of this invention is to provide a method of reducing the amount of residual carbohydrates during the fermentation of the starting material by the addition of yeast.

With this object in view, this invention embraces broadly the concept of providing a method of producing butylene glycol by the fermentation of carbohydrates in which a high concentration of selected carbohydrates in proportion to the bacterial culture is employed and in which this concentration may be maintained during the fermentation by the introduction of additional carbohydrates. Moreover, during the fermentation, the hydrogen ion concentration is maintained within a specified range by neutralizing the acids formed during the fermentation. The principal feature of the invention resides in the use of a culture of yeast during the process to convert residual carbohydrates to alcohol.

In practicing this process the bacterial medium may be prepared in a manner similar to that described in my co-pending application. For example, an Aerobacter or similar bacteria is employed to promote the fermentation, and preferably Aerobacter aerogenes is used although it is to be understood that any of the species of Aerobacter may be employed, and it is of course desirable to select a culture showing a high fermentation rate and other desirable characteristics.

In preparing the bacterial medium, a suitable culture of bacteria is isolated from the soil or other sources and may be carried on broth or peptone agar slants in the usual manner, building the inoculum for large scale fermentations in liquid media, or, if desired, the culture may be continually cultivated in liquid media, preferably transferring every four days.

Satisfactory liquid media may be made with cane or beet molasses, or with malted grains, preferably with the addition of malt, or other sources of growth stimulants, as will be subsequently described. The media must be suitably sterilized before use and the inoculation ratio is preferably one part of inoculum to ten or twenty parts of medium. The optimum temperature of the bacteria is about 37° C.

In the preferred process the culture is cultivated in molasses media, malted grain mashes or in grain mashes saccharified with malt bran or with dilute acid. In order to provide for proficiency in growth stimulants, malt, mold bran, or the like is added. Ordinarily 0.1 to 1.0 gram of barley malt or mold bran per 100 cubic centimeters of mash is added. Usually the added molasses and grain contain sufficient amounts of phosphates and other inorganic nutrients and a sufficient amount of nitrogenous material to satisfy the requirements of the bacteria.

A wide variety of carbohydrates including starch, dextrins, sucrose, maltose, lactose, levulose, xylose, arabinose, galactose, dextrose, and others, may be employed in the process, but it is preferred to use sugars rather than starch or dextrins because of the lower mash viscosity of the sugars.

The drawing discloses a single method of practicing the present invention.

This flow sheet illustrates a method of producing 2,3-butylene glycol by the fermentation of molasses in which the high concentration of sugar in proportion to the bacterial culture is maintained during the process and in which the hydrogen ion concentration is also controlled. This control of the sugar concentration markedly reduces the proportion of lactic acid to glycol formed during the process.

In this process the sugar concentration may be as high as 27 grams of sugar per 100 cubic centimeters of bacterial culture, but preferably the concentration is within the range of from 10 to 16 grams per 100 cubic centimeters of culture. During the fermentation of this mash the sugar concentration decreases rapidly for the first 48 to 60 hours, or until the concentration of sugars has been reduced to 6 grams per 100 cubic centimeters of medium. During this period the formation of lactic acid and other acids is practically negligible and the hydrogen ion concentration which at the start of the fermentation was about pH 6 remains substantially unchanged.

However, at this point, as evidenced in the marked reduction in the production of carbon dioxide and hydrogen, the fermentation suddenly changes and as the sugar concentrations fall below 5 grams per 100 cubic centimeters, the culture produces lactic acid as well as glycol and the proportion of lactic acid to glycol increases as the sugar concentration decreases.

However, at this point in the process, or preferably before this point is reached, the mash is inoculated without sterilizing with a culture of yeast such as Saccharomyces cerevisiae which has been cultivated in the usual manner. This inoculation completely converts the residual carbohydrates into ethyl alcohol which is removed from the mash by simple distillation, thereby making profitable use of the residual carbohydrates and at the same time greatly reducing the amount of residual carbohydrates.

Preferably before the inoculation with yeast, the sugar concentration is increased to from 16 to 18 grams per 100 cubic centimeters by the addition of sterile molasses, sugar syrup, or sugar, to prevent the formation of lactic acid. At the same time, the hydrogen ion concentration is controlled, if necessary, by adding neutralizing substances such as calcium carbonate so as to prevent the mixture reaching a pH above 5.0. By this means the lactic and other acids formed are neutralized.

It is sometimes possible to repeat this reinforcement several times, and of course it is preferable to add small quantities of sugar at more frequent intervals if feasible. Moreover, it is usually desirable to add a quantity of the nutrients and growth stimulants previously described with these sugar additions in about the same proportions that they were employed in the first mash.

By following the above procedure, the glycol concentration is markedly increased without a proportionate increase in the amount of lactic acids or residual sugars. This not only improves the yield of butylene glycol, but also serves to reduce the interference in the glycol recovery due to impurities.

The following example specifically illustrates this method of producing butylene glycol.

Example 300 grams of beet molasses containing 165 grams of total sugars, and 5 grams of mold bran, were diluted with water to 1500 cubic centimeters and sterilized in the autoclave one hour at 110° C. The medium was then cooled to 37° C. and inoculated with 100 cubic centimeters of a 24 hour old culture of Aerobacter aerogenes in a medium of the same composition, and the flask was incubated at 37° C. The hydrogen ion concentration was pH 6.6.

After 12 hours of fermentation it was found that the pH had dropped to 5.9 and that 52 grams of sugars had been fermented. 200 grams of sterile molasses containing 110 grams of sugars were then added, resulting in a sugar concentration of 13.3 grams per 100 cubic centimeters. At the end of 24 hours of fermentation, the pH was 5.80 and there were 126 grams of sugars remaining. 250 grams of sterile molasses containing 137.5 grams of total sugars were added, producing a sugar concentration of 13.7 grams per 100 cubic centimeters. At the end of 36 hours of fermentation the pH was 5.7 and 114 grams of sugars remained. 250 grams of sterile molasses containing 137.5 grams of sugars were added, producing a sugar concentration of 12.0 grams per 100 cubic centimeters. At the end of 48 hours of fermentation the pH was 5.48 and 140 grams of sugars remained.

Since the sugar disappearance between the 36th and the 48th hour was less than that in the preceding 12 hour period, and since there were other indications of decreasing fermentation rate, the medium was inoculated with 100 cubic centimeters of a 48 hour old culture of Saccharomyces cerevisiae in a medium containing 11 grams of sugars per 100 cubic centimeters. The fermentation was held at 32° C. for 48 hours. The residual sugar was then 0.15 gram per 100 cubic centimeters. The fermented mash was distilled, yielding 75 grams of ethyl alcohol. The residue was evaporated at atmospheric pressure to one third the original volume and extracted with ethyl ether. The ether extract was then fractionally distilled, yielding 205 grams of 2,3-butylene glycol boiling at 184° C. at 760 mm.

The total sugar added was 572 grams, including the sugar content of the inocula. The yield of alcohol was 13.1 percent of the total sugars, and that of the glycol was 35.9 percent. About three percent of the added sugar was not accounted for as alcohol or glycol. On the basis of the sugars fermented prior to inoculation with the yeast, the glycol yield was 48.7 percent, or 97.4 percent of theoretical, assuming one mol of hexose sugar yields one mol of the glycol, two mols of $CO_2$ and one of $H_2$. The yield of ethyl alcohol from the residual sugars was 97.5 percent of theoretical.

In a similar fermentation without pH control and without the secondary fermentation with yeast, the fermentation stopped when 5.15 grams of sugars remained per 100 cubic centimeters of the mash. The glycol yield was 34 percent of the total sugars, the lactic acid yield was 10.0 percent and 19.0 percent of the sugars remained unfermented. The sugar concentration was so high that it seriously interfered with the glycol recovery.

Instead of evaporating the fermented mash to small volume and extracting the glycol with ethyl ether or other suitable solvent, I might have evaporated it until all the water was removed, then distilled the glycol at 184° C. at 760 mm., or at a correspondingly lower temperature at a reduced pressure. This procedure cannot well be applied unless the content of sugars and other organic impurities is very low, because they decompose at the boiling point of the glycol and mechanically interfere with the glycol recovery. I prefer to evaporate until a large part or all of the water is removed and then extract the glycol with a suitable solvent, preferably one with a boiling point well below that of the glycol.

The procedure described in this application yields a solution of 2,3-butylene glycol, lactic acid or ethyl alcohol containing little or no residual sugar. It is therefore possible to evaporate the solution until most or all of the water has been removed. The glycol can then be recovered by extraction with any of a number of water immiscible solvents, such as, ethyl ether, or can be removed by distillation, preferably under reduced pressure. The yield of glycol is 40 to 45% of the sugar charged to the process. The balance of the sugar not represented by carbon dioxide or hydrogen is recovered as lactic acid or as alcohol.

While, for purposes of illustration, the processes have been described in connection with the use of sugar concentrates, it is obvious that other carbohydrates may be substituted without departing from the spirit of the invention, and that other bacterial medium and growth stimulants can be employed.

It is therefore to be understood that this invention is to be limited only by the scope of the appended claims.

I claim:

1. A method of fermenting carbohydrates to produce 2,3 butylene glycol comprising inoculating the material containing fermentable carbohydrates with a culture of a 2,3 butylene glycol producing bacteria of the genus Aerobacter in the proportion of at least 10 grams of carbohydrates to 100 cubic centimeters of bacterial culture, anaerobically fermenting the resulting mash, controlling the carbohydrate concentration to prevent the concentration from falling below 6 grams per 100 cubic centimeters of bacterial culture by introducing additional fermentable carbohydrates to the mixture during the fermentation, and adding a yeast to the mixture during fermentation to convert the residual carbohydrates to ethyl alcohol.

2. A method of fermenting carbohydrates to produce 2,3 butylene glycol comprising inoculating the material containing fermentable carbohydrates with a culture of a 2,3 butylene glycol producing bacteria of the genus Aerobacter in the proportion of at least 10 grams of carbohydrates to 100 cubic centimeters of bacterial culture, anaerobically fermenting the resulting mash, controlling the carbohydrate concentration to prevent the concentration from falling below 6 grams per 100 cubic centimeters of bacterial culture by introducing additional fermentable carbohydrates to the mixture during the fermentation, adding a yeast to the mixture during fermentation to convert the residual carbohydrates to ethyl alcohol, and adding a neutralizing agent to control the hydrogen ion concentration during the fermentation by preventing the formation of acids.

3. A method of fermenting carbohydrates to produce 2,3 butylene glycol comprising inoculating the material containing fermentable carbohydrates with a culture of a 2,3 butylene glycol producing Aerobacter aerogenes in the proportion of at least 10 grams of carbohydrates to 100 cubic centimeters of bacterial culture, anaerobically fermenting the resulting mash, controlling the carbohydrate concentration to prevent the concentration from falling below 6 grams per 100 cubic centimeters of bacterial culture by introducing additional fermentable carbohydrates to the mixture during the fermentation, adding a yeast to the mixture during fermentation to convert the residual carbohydrates to ethyl alcohol, and adding an inorganic neutralizing substance to the mixture to neutralize the acid formed during the fermentation and control the hydrogen ion concentration.

4. A method of fermenting carbohydrates to produce 2,3 butylene glycol comprising inoculating the material containing fermentable carbohydrates with a culture of a 2,3 butylene glycol producing Aerobacter aerogenes in the proportion of at least 10 grams of carbohydrates to 100 cubic centimeters of bacterial culture, anaerobically fermenting the resulting mash, controlling the carbohydrate concentration to prevent the concentration from falling below 6 grams per 100 cubic centimeters of bacterial culture by introducing additional carbohydrates to the mixture during the fermentation, adding a yeast to the mixture during fermentation to convert the residual carbohydrates to ethyl alcohol, and adding a neutralizing substance to the mixture to neutralize the acid formed during the fermentation and control the hydrogen ion concentration at a pH of less than 5.

5. A method of fermenting carbohydrates to produce 2,3 butylene glycol comprising inoculating the material containing fermentable carbohydrates with a culture of a 2,3 butylene glycol producing Aerobacter aerogenes in the proportions of at least 10 to 16 grams of carbohydrates to 100 cubic centimeters of bacterial medium, anaerobically fermenting the resulting mash, controlling the carbohydrate concentration to prevent the concentration from falling below 6 grams per 100 cubic centimeters of bacterial medium by introducing additional fermentable carbohydrates to the mixture during the fermentation, adding a yeast to the mixture during fermentation to convert the residual carbohydrates to ethyl alcohol, and adding inorganic neutralizing substance to the mixture to neutralize the acid formed during the fermentation and control the hydrogen ion concentration at a pH of less than 5.

6. A method of fermenting carbohydrates to produce 2,3 butylene glycol comprising inoculating a material containing fermentable carbohydrates with a culture of a 2,3 butylene glycol producing Aerobacter aerogenes in the proportions of at least 10 grams of carbohydrates to 100 cubic centimeters of bacterial culture, anaerobically fermenting the resulting mash and adding yeast to the mixture during fermentation without sterilizing the mash to convert the residual carbohydrates to ethyl alcohol.

LEO M. CHRISTENSEN.